US012592173B2

(12) United States Patent
Kim et al.

(10) Patent No.: US 12,592,173 B2
(45) Date of Patent: Mar. 31, 2026

(54) PSEUDO SIGNAL GENERATOR AND DISPLAY APPARATUS INCLUDING THE SAME

(71) Applicant: LG Display Co., Ltd., Seoul (KR)

(72) Inventors: Jun Su Kim, Paju-si (KR); Byung Woong Kim, Paju-si (KR); Seung Hyun Cho, Paju-si (KR); Jong Yul Lim, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 18/932,421

(22) Filed: Oct. 30, 2024

(65) Prior Publication Data

US 2025/0218325 A1 Jul. 3, 2025

(30) Foreign Application Priority Data

Dec. 29, 2023 (KR) ........................ 10-2023-0197122

(51) Int. Cl.
*G09G 3/3266* (2016.01)
*G09G 3/20* (2006.01)

(52) U.S. Cl.
CPC ... *G09G 3/2003* (2013.01); *G09G 2300/0871* (2013.01); *G09G 2310/0286* (2013.01)

(58) Field of Classification Search
CPC ......... G09G 3/2003; G09G 2300/0871; G09G 2310/0289; G09G 3/3266; G09G 3/3674
See application file for complete search history.

(56) References Cited

U.S. PATENT DOCUMENTS

2023/0058571 A1* 2/2023 Byeon .................. G09G 3/3674

FOREIGN PATENT DOCUMENTS

| | | | |
|---|---|---|---|
| KR | 10-1609378 | B1 | 4/2016 |
| KR | 10-2018-0086796 | A | 8/2018 |
| KR | 10-2020-0023860 | A | 3/2020 |
| KR | 10-2021-0083794 | A | 7/2021 |

* cited by examiner

*Primary Examiner* — Dennis P Joseph
(74) *Attorney, Agent, or Firm* — Fenwick & West LLP

(57) ABSTRACT

A display apparatus includes a display panel configured to display an image, a shift register configured to output a gate signal which is to be applied to the display panel, based on a periodicity signal output from a level shifter, a pseudo generator configured to sense the periodicity signal to convert it into a current and invert a phase to output as a pseudo signal of an inverted current type, and a pseudo pattern part disposed on the display panel, the pseudo pattern part including a pattern where the pseudo signal is applied.

11 Claims, 16 Drawing Sheets

PSEUDO SIGNAL GENERATOR AND DISPLAY APPARATUS INCLUDING THE SAME

This application claims the benefit of the Republic of Korea Patent Application No. 10-2023-0197122 filed on Dec. 29, 2023, which is hereby incorporated by reference in its entirety.

BACKGROUND

Field of Technology

The present disclosure relates to a pseudo signal generator and a display apparatus including the same.

Discussion of the Related Art

As information technology advances, the market for display apparatuses which are a connection medium between a user and information is growing. Therefore, the use of display apparatuses such as light emitting display apparatuses, quantum dot display (QDD) apparatuses, and liquid crystal display (LCD) apparatuses is increasing.

The display apparatuses described above include a display panel which includes a plurality of subpixels, a driver which outputs a driving signal for driving the display panel, and a power supply which generates power which is to be supplied to the display panel or the driver.

In such display apparatuses, when the driving signal (for example, a scan signal and a data signal) is supplied to each of the subpixels provided in the display panel, a selected subpixel may transmit light or may self-emit light, and thus, an image may be displayed.

SUMMARY

The present disclosure may solve a problem of radiation mismatching caused by a load difference between a shift register and a pseudo pattern part, may increase robustness to noise, and may offset and minimize an electric field causing electromagnetic interference (EMI). Also, the present disclosure may a pseudo signal of a current type corresponding to clock signals and may summate at least one of the signals to decrease an area occupied by a pseudo pattern part and an integration pattern of the pseudo pattern part, thereby reducing a bezel region of a display panel.

To achieve these objects and other advantages and in accordance with the purpose of the disclosure, as embodied and broadly described herein, a display apparatus includes: a display panel configured to display an image; a shift register configured to output a gate signal which is to be applied to the display panel, based on a periodicity signal output from a level shifter; a pseudo generator configured to sense the periodicity signal to convert it into a current and invert a phase to output as a pseudo signal of an inverted current type; and a pseudo pattern part disposed on the display panel, the pseudo pattern part including a pattern where the pseudo signal is applied.

The pseudo pattern part may include a pattern for offsetting an electric field generated from the periodicity signal, based on the pseudo signal.

The pseudo generator may include: a current sensing circuit configured to sense the periodicity signal and a phase inverting circuit configured to invert a phase of a sensed current to output as the pseudo signal of the inverted current type.

The pseudo generator may include a current sensing and phase inverting circuit including a first transistor configured to sense the periodicity signal to convert it into a current and a second transistor configured to operate identical to the first transistor and invert a phase of a sensed current to output as the pseudo signal of the inverted current type.

The first transistor and the second transistor may be configured as a current mirror type.

The first transistor may include a first electrode connected to an input terminal, a second electrode connected to an output terminal, and a gate electrode connected to the output terminal and a gate electrode of the second transistor, and the second transistor may include a first electrode connected to the pseudo pattern part, a second electrode connected to a ground terminal, and the gate electrode connected to the output terminal and the gate electrode of the first transistor.

The pseudo generator may further include a current summation circuit configured to summate one or more inverted currents to generate a pseudo signal of a summation current type.

The pseudo generator and the pseudo pattern part may be disposed in a non-display area of the display panel.

The periodicity signal may include clock signals.

In another embodiment of the present disclosure, a pseudo signal generator includes: a pseudo generator configured to sense a periodicity signal to convert it into a current and invert a phase to output as a pseudo signal of an inverted current type; and a pseudo pattern part including a pattern for offsetting an electric field generated from the periodicity signal, based on the pseudo signal.

The pseudo generator may include a first transistor configured to sense the periodicity signal to convert it into a current and a second transistor configured to operate identical to the first transistor and invert a phase of a sensed current to output as the pseudo signal of the inverted current type.

The first transistor may include a first electrode connected to an input terminal, a second electrode connected to an output terminal, and a gate electrode connected to the output terminal and a gate electrode of the second transistor, and the second transistor may include a first electrode connected to the pseudo pattern part, a second electrode connected to a ground terminal, and the gate electrode connected to the output terminal and the gate electrode of the first transistor.

At least one of the pseudo generator and the pseudo pattern part may further include a current summation circuit configured to summate one or more inverted currents to generate a pseudo signal of a summation current type.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

A display apparatus according to the present disclosure may be applied to televisions (TVs), video players, personal computers (PCs), home theaters, electronic devices for vehicles, and smartphones, but is not limited thereto. The display apparatus according to the present disclosure may be implemented as a light emitting display apparatus, a quantum dot display (QDD) apparatus, or a liquid crystal display (LCD) apparatus. Hereinafter, for convenience of description, a light emitting display apparatus self-emitting light by using an inorganic light emitting diode or an organic light emitting diode will be described for example.

Moreover, a transistor described below may be implemented with an n-type transistor, a p-type transistor, or a combination of an n-type transistor and a p-type transistor. A transistor may be a three-electrode element including a gate, a source, and a drain. The source may be an electrode which provides a carrier to a transistor. In the transistor, a carrier may start to flow from the source. The drain may be an electrode where the carrier flows from the transistor to the outside. That is, in the transistor, the carrier flows from the source to the drain.

In the p-type transistor, because a carrier is a hole, a source voltage may be higher than a drain voltage so that the hole flows from the source to the drain. In the p-type transistor, because the hole flows from the source to the drain, a current may flow from the source to the drain. On the other hand, in the n-type transistor, because a carrier is an electron, a source voltage may be lower than a drain voltage so that the electron flows from the source to the drain. In the n-type transistor, because the electron flows from the drain to the source, a current may flow from the drain to the source. However, a source and a drain of a transistor may switch therebetween based on a voltage applied thereto. Based thereon, in the following description, one of a source and a drain will be described as a first electrode, and the other of the source and the drain will be described as a second electrode.

Figure 1:
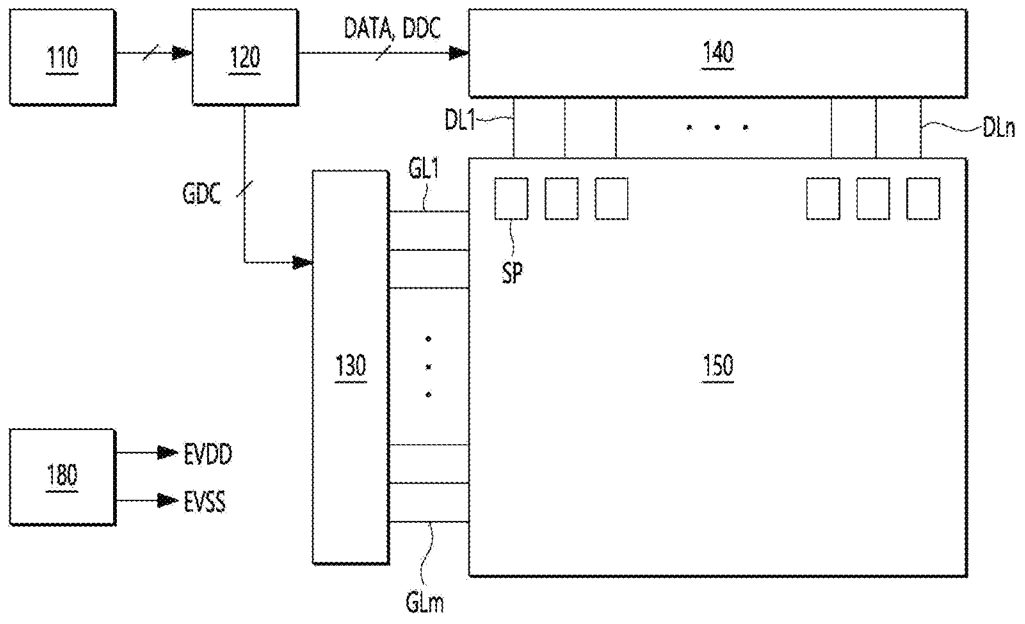
FIG. 1 is a block diagram schematically illustrating a light emitting display apparatus according to one embodiment.
Figure 2:
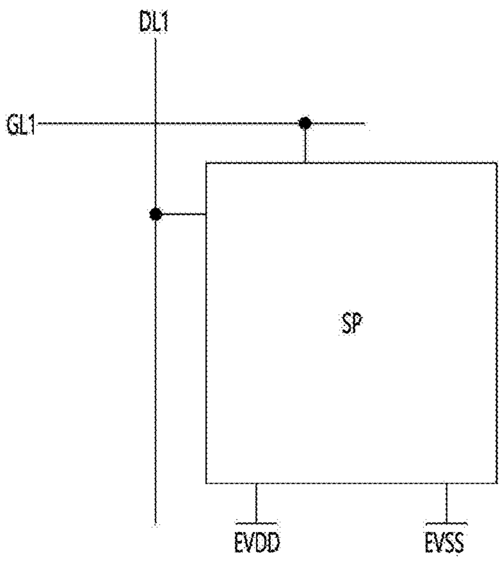
FIG. 2 is a diagram schematically illustrating a subpixel illustrated in FIG. 1 according to one embodiment.

FIG. 1 is a block diagram schematically illustrating a light emitting display apparatus according to one embodiment, and FIG. 2 is a diagram schematically illustrating a subpixel illustrated in FIG. 1 according to one embodiment.

As illustrated in FIGS. 1 and 2, a light emitting display apparatus according to an embodiment of the present disclosure may include a timing controller 120, a gate driver (a gate driving circuit) 130, a data driver (a data driving circuit) 140, a display panel 150, and a power supply 180.

A video supply unit 110 (a set or a host system) may output a video data signal supplied from the outside or various driving signals and an image data signal (a video data signal) stored in an internal memory thereof. The video supply unit 110 may supply a data signal and the various driving signals to the timing controller 120.

The timing controller 120 may output a gate timing control signal GDC for controlling an operation timing of the gate driver 130, a data timing control signal DDC for controlling an operation timing of the data driver 140, and various synchronization signals. The timing controller 120 may provide the data driver 140 with the data timing control signal DDC and a data signal DATA supplied from the video supply unit 110. The timing controller 120 may be implemented as an integrated circuit (IC) type and may be mounted on a printed circuit board (PCB), but is not limited thereto.

The gate driver 130 may output a gate signal (or a gate voltage) in response to the gate timing control signal GDC supplied from the timing controller 120. The gate driver 130 may supply the gate signal to a plurality of subpixels, included in the display panel 150, through a plurality of gate lines GL1 to GLm. The gate driver 130 may be implemented as an IC type or may be directly provided on the display panel 150 in a gate in panel (GIP) type, but is not limited thereto.

In response to the data timing control signal DDC supplied from the timing controller 120, the data driver 140 may sample and latch the data signal DATA, convert a digital data signal into an analog data voltage, based on a gamma reference voltage, and output the analog data voltage. The data driver 140 may respectively supply data voltages to the subpixels of the display panel 150 through a plurality of data lines DL1 to DLn. The data driver 140 may be implemented as an IC type or may be mounted on the display panel 150 or a PCB, but is not limited thereto.

The power supply 180 may generate a high-level voltage and a low-level voltage, based on an external input voltage supplied from the outside, and may output the high-level voltage and the low-level voltage through a high-level power line EVDD and a low-level power line EVSS. The power supply 180 may generate and output a voltage (a gate high voltage and a gate low voltage) needed for driving of the gate driver 130 or a voltage needed for driving of the data driver 140, in addition to the high-level voltage and the low-level voltage.

The display panel 150 may display an image (video), based on a driving voltage including the high-level voltage and the low-level voltage and a driving signal including the gate signal and a data voltage. The subpixels of the display panel 150 may each self-emit light. The display panel 150 may be manufactured based on a substrate, having stiffness or flexibility, such as glass, silicon, or polyimide. Also, the subpixels emitting light may include pixels including red, green, and blue, or may include pixels including red, green, blue, and white.

For example, one subpixel SP may be connected to a first data line DL1, a first gate line GL1, the high-level power line EVDD, and the low-level power line EVSS and may include a pixel circuit which includes a switching transistor, a driving transistor, a capacitor, and an organic light emitting diode. The subpixel SP used in the light emitting display apparatus may self-emit light and may be complicated in configuration of a circuit. Also, an organic light emitting diode emitting light may be diversified, and a compensation circuit which compensates for a degradation in a driving transistor supplying a driving current needed for driving of the organic light emitting diode may be diversified. Accordingly, the subpixel SP may be simply illustrated in a block shape.

Hereinabove, each of the timing controller 120, the gate driver 130, and the data driver 140 has been described as an individual element. However, based on an implementation type of the light emitting display apparatus, one or more of the timing controller 120, the gate driver 130, and the data driver 140 may be integrated into one IC.

Figure 3:
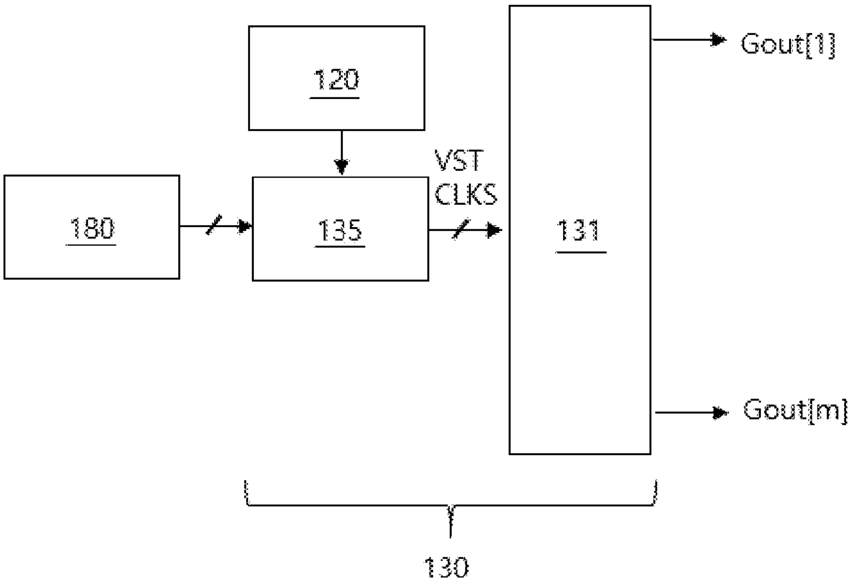
FIGS. 3 and 4 are diagrams for describing a configuration of a gate driver of a gate in panel (GIP) type according to one embodiment.
Figure 4:
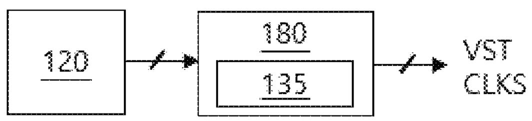
Figure 5:
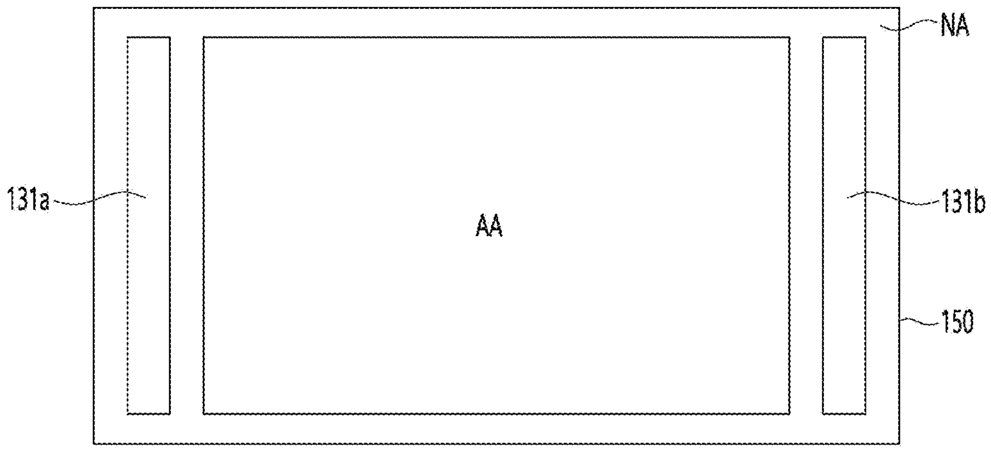
FIG. 5 is a diagram illustrating an arrangement example of a GIP-type gate driver according to one embodiment.

FIGS. 3 and 4 are diagrams for describing a configuration of a GIP-type gate driver 130 according to one embodiment, and FIG. 5 is a diagram illustrating an arrangement example of a GIP-type gate driver according to one embodiment.

As illustrated in FIG. 3, the GIP-type gate driver 130 may include a shift register 131 and a level shifter 135. The level shifter 135 may generate clock signals CLKS and a start signal VST, based on signals and voltages output from the timing controller 120 and the power supply 180.

The clock signal CLKS may be output through clock signal lines, and the start signal VST may be output through a start signal line. The shift register 131 may operate based on the clock signals CLKS and the start signal VST and may output gate signals Gout[1] to Gout[m].

As illustrated in FIGS. 3 and 4, the level shifter 135 may be independently provided as an IC type unlike the shift register 131, or may be included in the power supply 180. However, this may be merely an embodiment, and embodiments of the present disclosure are not limited thereto.

As illustrated in FIG. 5, in the GIP-type gate driver 130, first and second shift registers 131*a* and 131*b* outputting gate signals may be respectively disposed in left and right non-display areas NA with respect to a display area AA in the display panel 150 which displays an image. The first and second shift registers 131*a* and 131*b* may be formed as a thin film type in the display panel 150, based on the GIP type.

An example where the first and second shift registers 131*a* and 131*b* are respectively disposed in the left and right non-display areas NA of the display panel 150, but embodiments of the present disclosure are not limited thereto.

Figure 6:
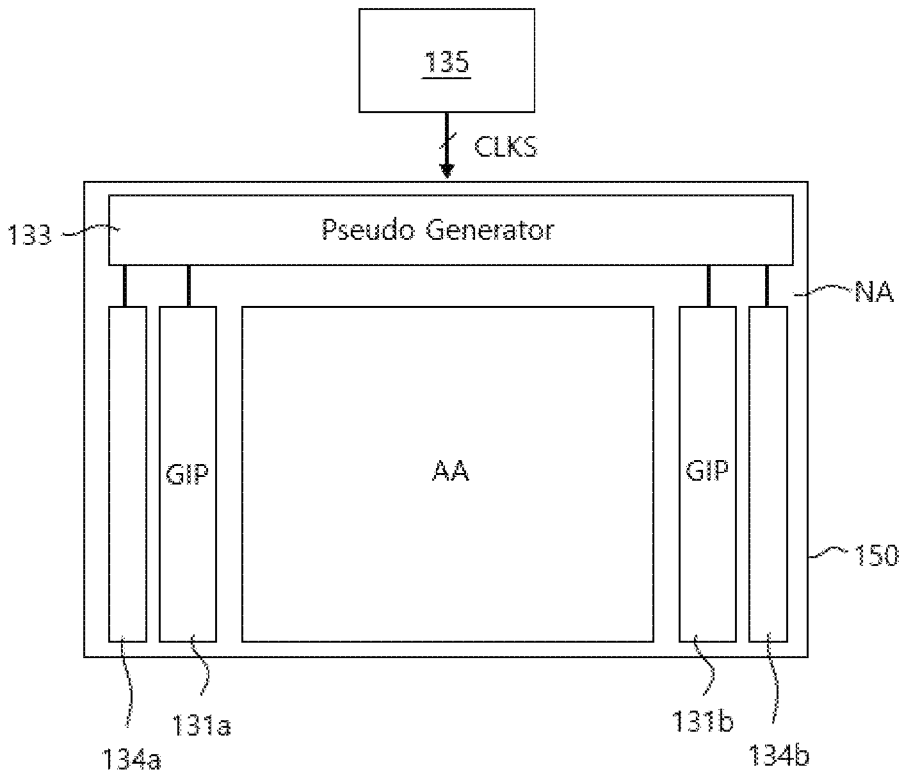
FIG. 6 is a plan view illustrating a portion of a light emitting display apparatus according to a first embodiment.
Figure 7:
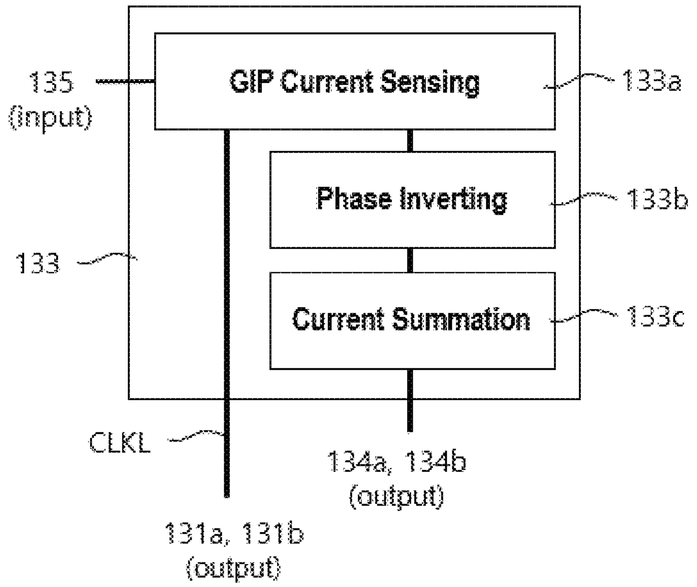
FIG. 7 is a block diagram illustrating a pseudo generator illustrated in FIG. 6 according to one embodiment.
Figure 8:
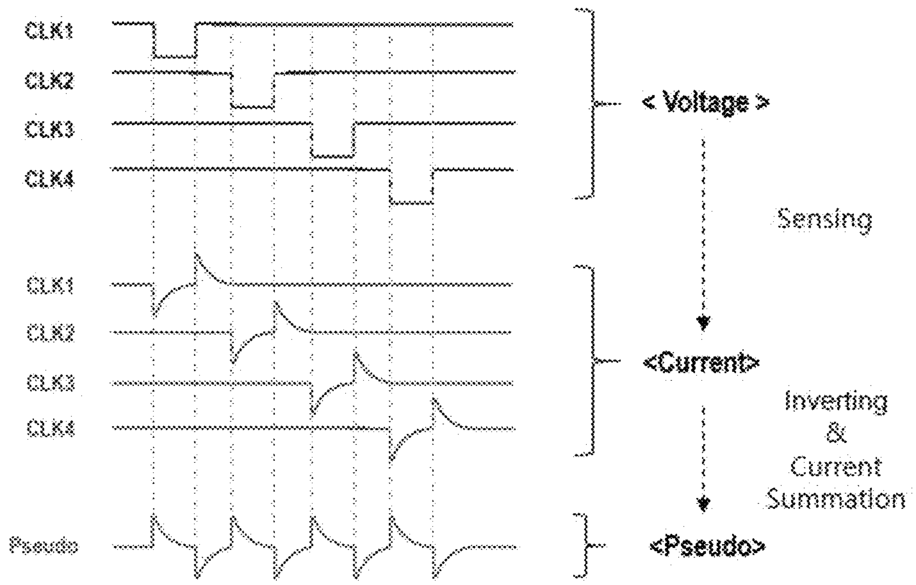
FIG. 8 is a diagram for describing an input/output change of a pseudo generator according to a first embodiment.

FIG. 6 is a plan view illustrating a portion of a light emitting display apparatus according to a first embodiment, FIG. 7 is a block diagram illustrating a pseudo generator illustrated in FIG. 6 according to one embodiment, and FIG. 8 is a diagram for describing an input/output change of a pseudo generator according to a first embodiment.

As illustrated in FIG. 6, the light emitting display apparatus according to the first embodiment may include a pseudo generator 133 (or a pseudo signal generator) and pseudo pattern parts 134*a* and 134*b*. The pseudo generator 133 and the pseudo pattern parts 134*a* and 134*b* may be disposed in a non-display area NA of a display panel 150.

The pseudo generator 133 (e.g., a circuit) may be disposed in a non-display area NA located at an upper side of a display area AA, and the pseudo pattern parts 134*a* and 134*b* may be respectively disposed in non-display areas NA located at left and right sides of the display area AA. The pseudo pattern parts 134*a* and 134*b* (e.g., circuits) may include first and second pseudo pattern parts 134*a* and 134*b* which are disposed to correspond to the first and second shift registers 131*a* and 131*b*, respectively. The first and second pseudo pattern parts 134*a* and 134*b* may be implemented with a conductive pattern configuring a specific shape so as to offset and minimize an electric field causing electromagnetic interference (EMI).

In FIG. 6, an example is illustrated where the first and second pseudo pattern parts 134*a* and 134*b* are respectively adjacent to the first and second shift registers 131*a* and 131*b* and are disposed to be differentiated from each other. However, FIG. 6 may be merely for showing that the first and second pseudo pattern parts 134*a* and 134*b* are disposed adjacent to the first and second shift registers 131*a* and 131*b*. For example, the first pseudo pattern part 134*a* may be included in the first shift register 131*a* or may be disposed between the first shift register 131*a* and the display area AA, and the second pseudo pattern part 134*b* may be included in the second shift register 131*b* or may be disposed between the second shift register 131*b* and the display area AA.

As illustrated in FIGS. 6 and 7, according to the first embodiment, the pseudo generator 133 may solve a problem of radiation mismatching between pseudo signals generated from the pseudo pattern parts 134*a* and 134*b* and clock signals which are output from the level shifter 135 and are applied to the first and second shift registers 131*a* and 131*b*.

The pseudo generator 133 may include a current sensing circuit 133*a*, a phase inverting circuit 133*b*, and a current summation circuit 133*c*.

The current sensing circuit 133*a* may sense the clock signals output from the level shifter 135 and applied to the first and second shift registers 131*a* and 131*b* to output as a current type. The current sensing circuit 133*a* may include an input terminal connected to a clock signal output terminal of the level shifter 135 and an output terminal connected to a clock signal input terminal of each of the first and second shift registers 131*a* and 131*b*. That is, clock signal lines CLKL transferring the clock signals may be disposed between the level shifter 135 and the first and second shift registers 131*a* and 131*b* and may be interconnected to pass through the current sensing circuit 133*a*.

The phase inverting circuit 133*b* may invert (180-degree invert) phases of the clock signals which are sensed by the current sensing circuit 133*a* and are output as a current type, and thus, may output clock signals as an inverted current type.

The current summation circuit 133*c* may summate and output one or more of inverted currents of clock signals which are output through inversion by the phase inverting circuit 133*b*. A summation current output from the current summation circuit 133*c* may be applied to the first and second pseudo pattern parts 134*a* and 134*b*.

As illustrated in FIGS. 7 and 8, for example, a total of four clock signals CLK1 to CLK4 applied to the pseudo generator 133 may have a voltage type. The four clock signals CLK1 to CLK4 of a voltage type may be converted into a current type by a sensing operation of the current sensing circuit 133*a* of the pseudo generator 133. The four clock signals CLK1 to CLK4 of a current type may be inverted in phase and may be output as one pseudo signal (Pseudo) of a current type, based on a phase inverting operation and a current summation operation of the phase inverting circuit 133*b* and the current summation circuit 133*c* of the pseudo generator 133.

Hereinafter, based on a second embodiment, a portion associated with the pseudo generator 133 may be specified, and an effect based thereon will be described.

Figure 9:
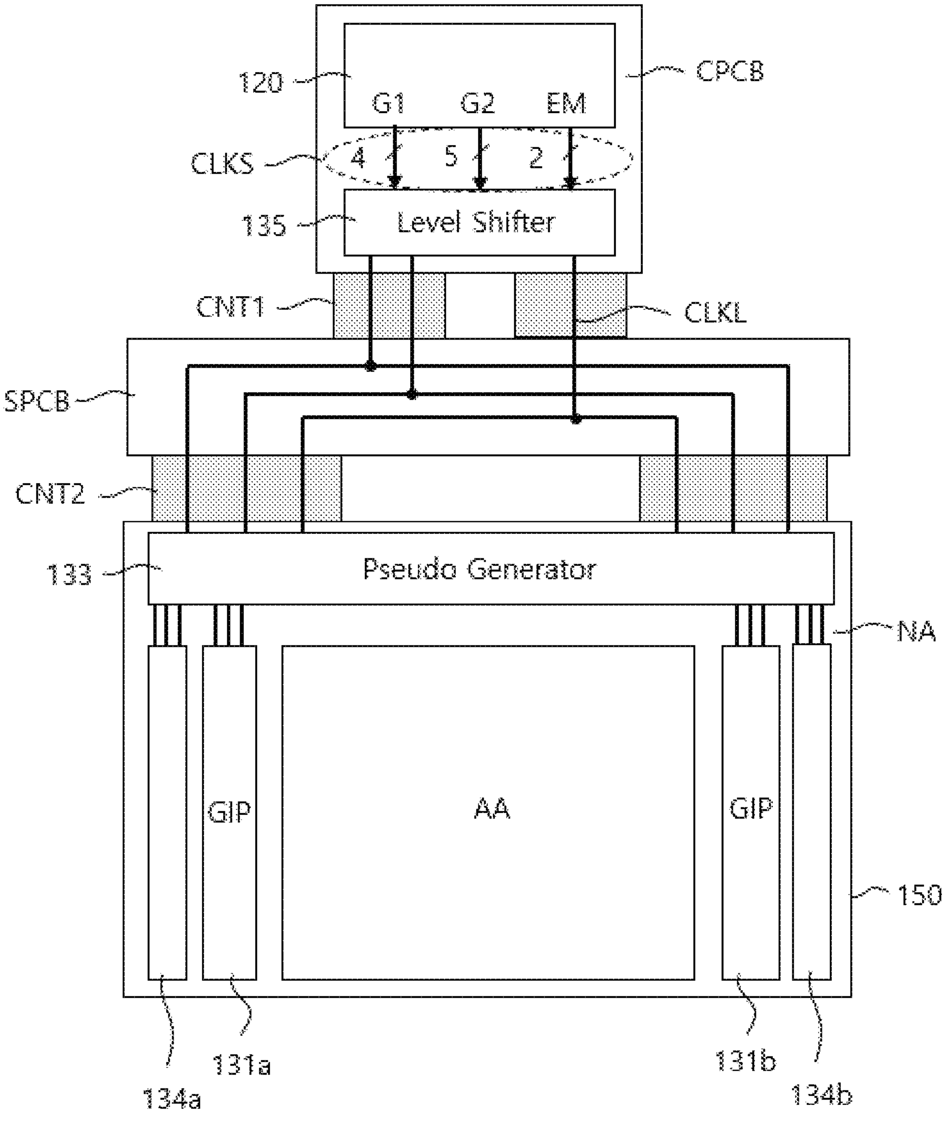
FIG. 9 is a plan view illustrating a portion of a light emitting display apparatus according to a second embodiment.
Figure 10:
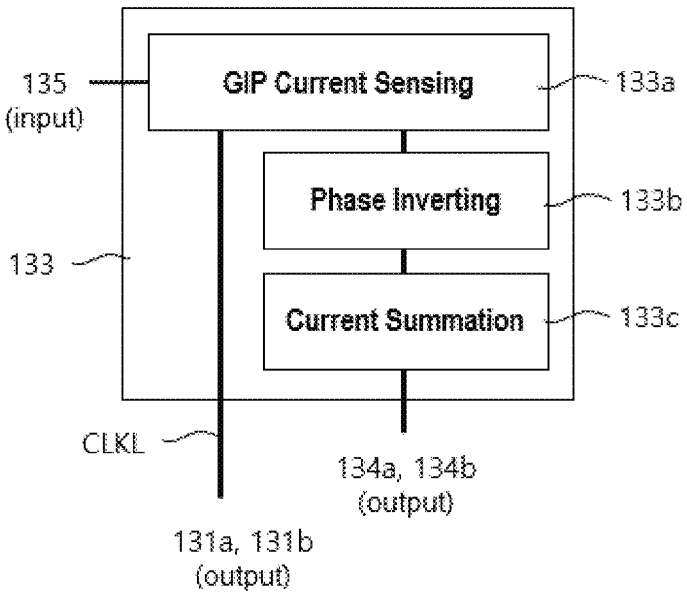
FIG. 10 is a block diagram illustrating a pseudo generator illustrated in FIG. 9 according to one embodiment.
Figure 11:
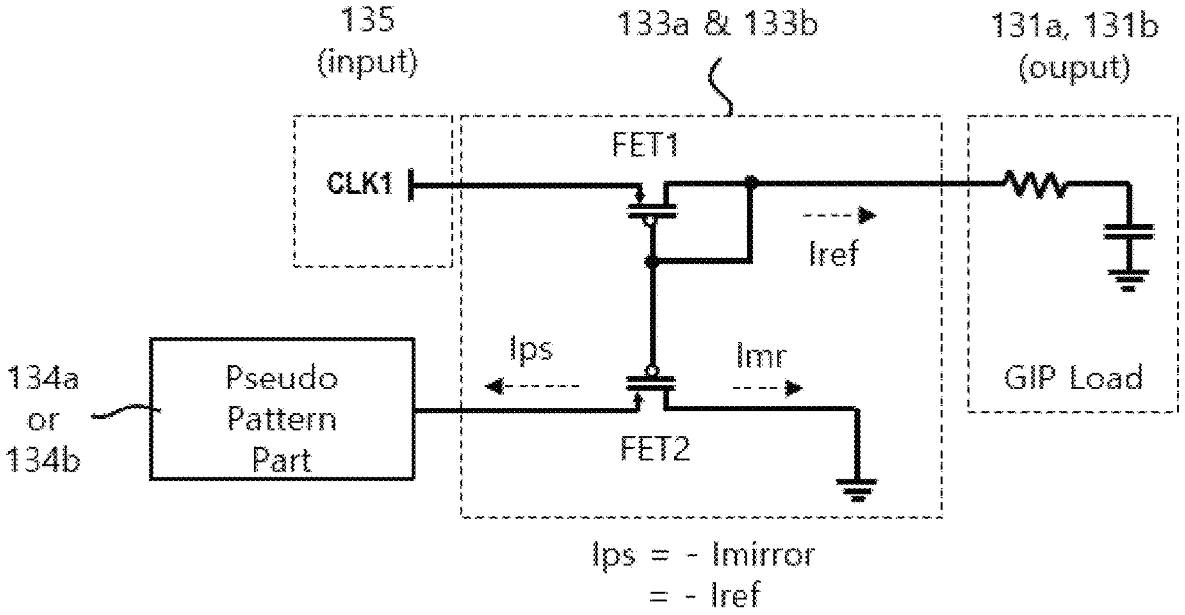
FIG. 11 is a circuit configuration diagram of a pseudo generator according to a second embodiment.

FIG. 9 is a plan view illustrating a portion of a light emitting display apparatus according to a second embodiment, FIG. 10 is a block diagram illustrating a pseudo generator illustrated in FIG. 9 according to one embodiment, and FIG. 11 is a circuit configuration diagram of a pseudo generator according to a second embodiment.

As illustrated in FIGS. 9 and 10, the light emitting display apparatus according to the second embodiment may include a control board CPCB, a first connector CNT1, a source board SPCB, a second connector CNT2, and a display panel 150.

The control board CPCB may include a timing controller 120 and a level shifter 135. The timing controller 120 may output clock signals CLKS including first clock signals G1, second clock signals G2, and third clock signals EM. For example, the first clock signals G1 may be used as clock signals for generating a first scan signal in a gate signal, the second clock signals G2 may be used as clock signals for generating a second scan signal in the gate signal, and the third clock signals EM may be used as clock signals for generating an emission signal in the gate signal.

The level shifter 135 may up-shift and output levels of the clock signals CLKS. The level shifter 135 may up-shift levels of the clock signals CLKS, based on a gate high voltage and a gate low voltage output from a power supply, but embodiments of the present disclosure are not limited thereto.

Hereinafter, in the second embodiment, an example where four-phase first clock signals G1, five-phase second clock signals G2, and two-phase third clock signals EM are output from the timing controller 120 will be described.

The control board CPCB and the source board SPCB may be electrically connected to each other by the first connector CNT1. The source board SPCB and the display panel 150 may be electrically connected to each other by the second connector CNT2.

Clock signal lines CLKL transferring the clock signals CLKS may be disposed in the first connector CNT1, the source board SPCB, the second connector CNT2, and the display panel 150. An example may be described where the clock signal lines CLKL are divisionally disposed on the source board SPCB so as to smoothly transfer the clock signals to first and second shift registers 131*a* and 131*b* respectively disposed in left and right non-display areas NA of the display panel 150.

The display panel 150 may include the first and second shift registers 131*a* and 131*b*, the pseudo generator 133, and the first and second pseudo pattern parts 134*a* and 134*b*. The pseudo generator 133 may solve a problem of radiation mismatching between pseudo signals generated from the pseudo pattern parts 134*a* and 134*b* and clock signals which are output from the level shifter 135 and are applied to the first and second shift registers 131*a* and 131*b*.

The pseudo generator 133 may include a current sensing circuit 133*a*, a phase inverting circuit 133*b*, and a current summation circuit 133*c*. A function of each of the current sensing circuit 133*a*, the phase inverting circuit 133*b*, and the current summation circuit 133*c* may refer to the first embodiment.

As illustrated in FIGS. 10 and 11, according to the second embodiment, a current sensing and phase inverting circuit 133*a* and 133*b* may be integrated as one circuit. The current sensing and phase inverting circuit 133*a* & 133*b* may sense clock signals output from the level shifter 135 and applied to the first and second shift registers 131*a* and 131*b* to convert it into a current type and may invert a phase to output as an inverted current type.

The current sensing and phase inverting circuit 133*a* & 133*b* may be implemented as a current mirror type. The current sensing and phase inverting circuit 133*a* & 133*b* may include a first transistor FET1 and a second transistor FET2.

The first transistor FET1 may include a first electrode (a source electrode) connected to an input terminal, a second electrode (a drain electrode) connected to an output terminal, and a gate electrode connected to the output terminal and a gate electrode of the second transistor FET2. The second transistor FET2 may include a first electrode (a source electrode) connected to the first or second pseudo pattern part 134*a* or 134*b*, a second electrode (a drain electrode) connected to a ground terminal, and a gate electrode connected to the output terminal and the gate electrode of the first transistor FET1.

Hereinafter, an operation of outputting, as a phase-inverted current type, a first clock signal applied to the current sensing and phase inverting circuit 133*a* & 133*b* will be described.

A first clock signal CLK input as a voltage type may be generated as a first reference current Iref and may be output through the first or second shift register 131*a* or 131*b*, based on an operation of the first transistor FET1.

The second transistor FET2 may operate identical to the first transistor FET1 and may perform a sensing operation (a current mirror operation) of generating the same first mirror current Imr as the first reference current Iref through the second electrode and outputting it to the ground terminal. Also, the second transistor FET2 may perform a phase inverting operation of generating a first inverted current Ips opposite to the first reference current Iref through the first electrode and outputting it to the first or second pseudo pattern part 134*a* or 134*b*. On the contrary to the first transistor FET1, because the first electrode (the source electrode) of the second transistor FET2 is connected to the first or second pseudo pattern part 134*a* or 134*b*, a current may flow in a reverse direction opposite to a sensed current, and thus, the second transistor FET2 may generate a phase-inverted current.

As described above, the current sensing and phase inverting circuit 133*a* & 133*b* may sense a current flowing in a clock signal through a current mirror and may allow a current to flow in a reverse direction opposite to a sensed current, and thus, may invert a phase of an input current to output a phase-inverted current.

Hereinafter, an operation of generating a pseudo signal corresponding to a clock signal(s) output from the level shifter 135 illustrated in FIG. 9 will be described as an example where the pseudo generator 133 according to the second embodiment is applied.

FIGS. 12 to 17 are diagrams of an example where the pseudo generator of FIG. 11 is applied and diagrams for describing an input/output change based thereon according to one embodiment.

Figure 12:
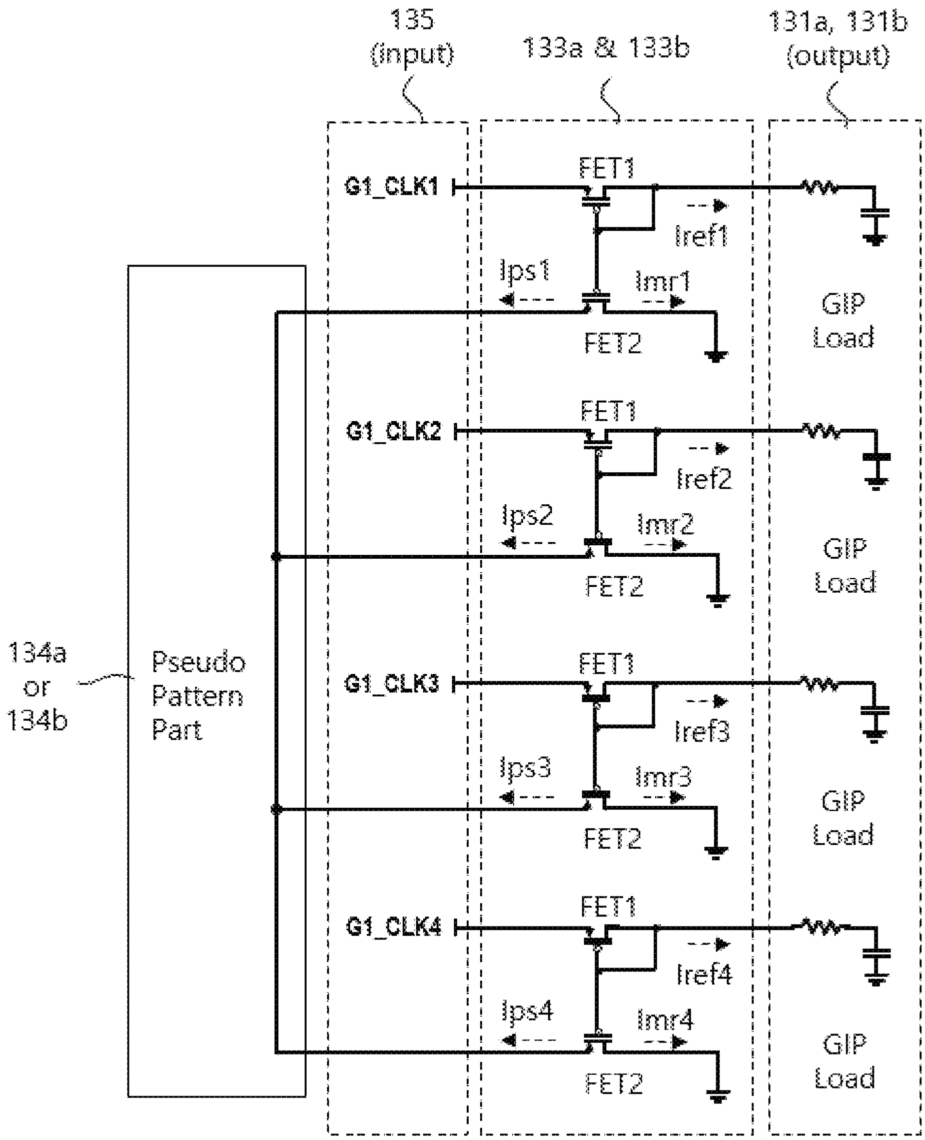
FIGS. 12 to 17 are diagrams of an example where the pseudo generator of FIG. 11 is applied and diagrams for describing an input/output change based thereon according to one embodiment.
Figure 13:
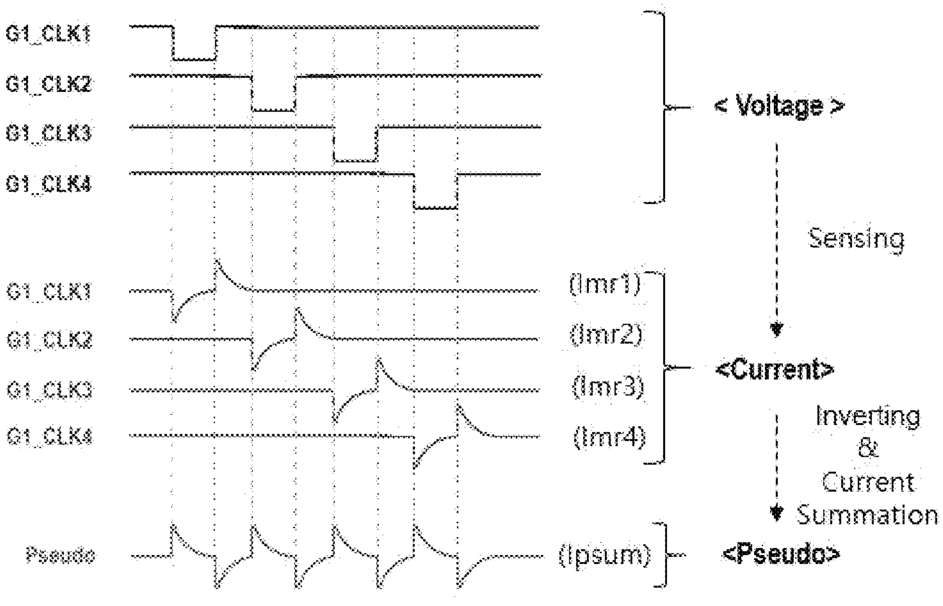

As illustrated in FIGS. 9, 12, and 13, four-phase first clock signals G1 output from the timing controller 120 may be up-shifted in level by the level shifter 135 and may thus be converted into first clock signals G1_CLK1 to G1_CLK4, and then, the first clock signals G1_CLK1 to G1_CLK4 may be applied to the current sensing and phase inverting circuit 133*a* & 133*b*.

First reference currents Iref1 to Iref4, first mirror currents Imr1 to Imr4, and first inverted currents Ips1 to Ips4 may be generated from the first clock signals G1_CLK1 to G1_CLK4 by the current sensing and phase inverting circuit 133*a* & 133*b*. Also, the first inverted currents Ips1 to Ips4 may be applied to the first or second pseudo pattern part 134*a* or 134*b* and may then be summated (Ipsum'), and thus, one pseudo signal may be generated.

Figure 14:
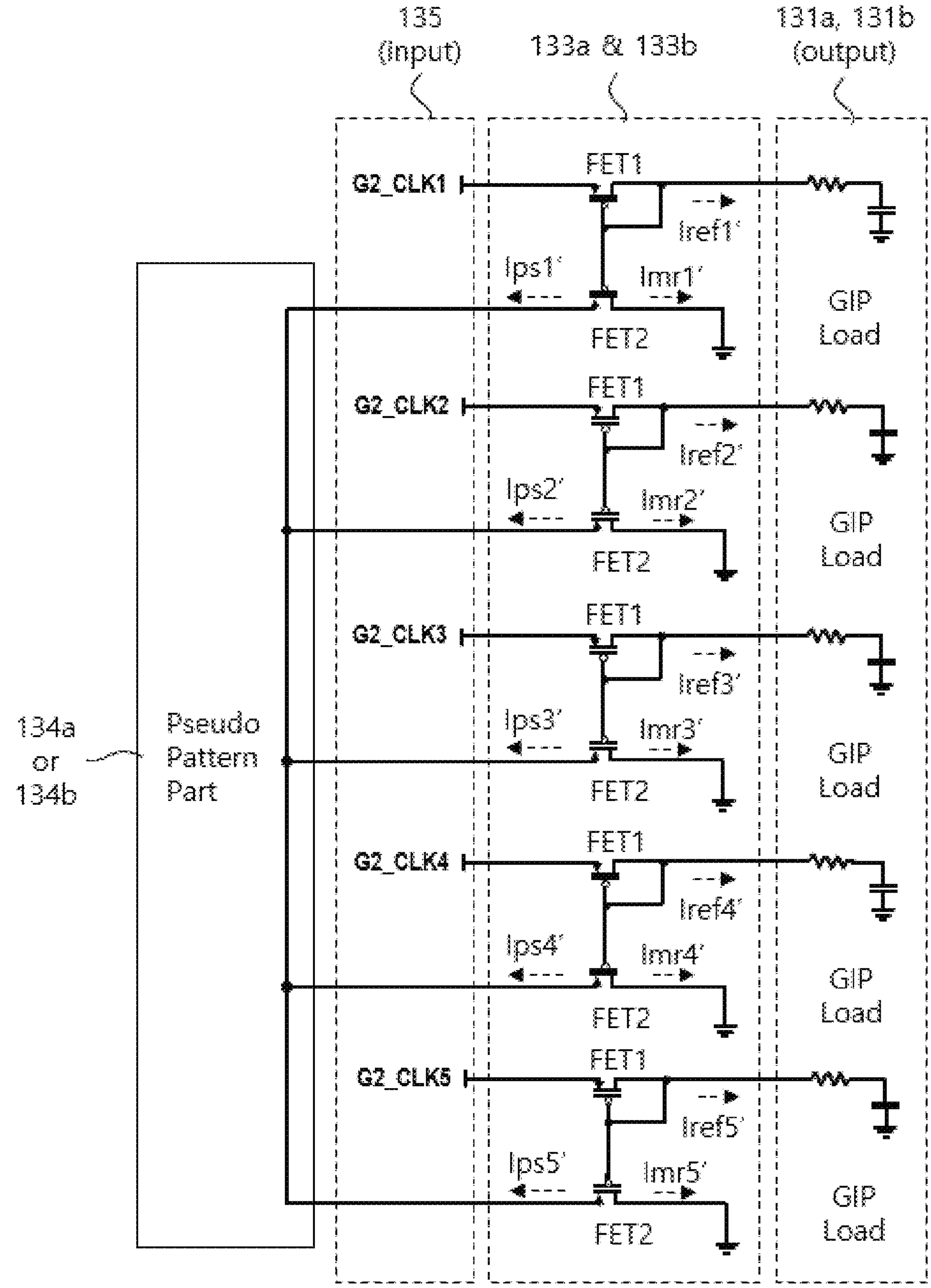
Figure 15:
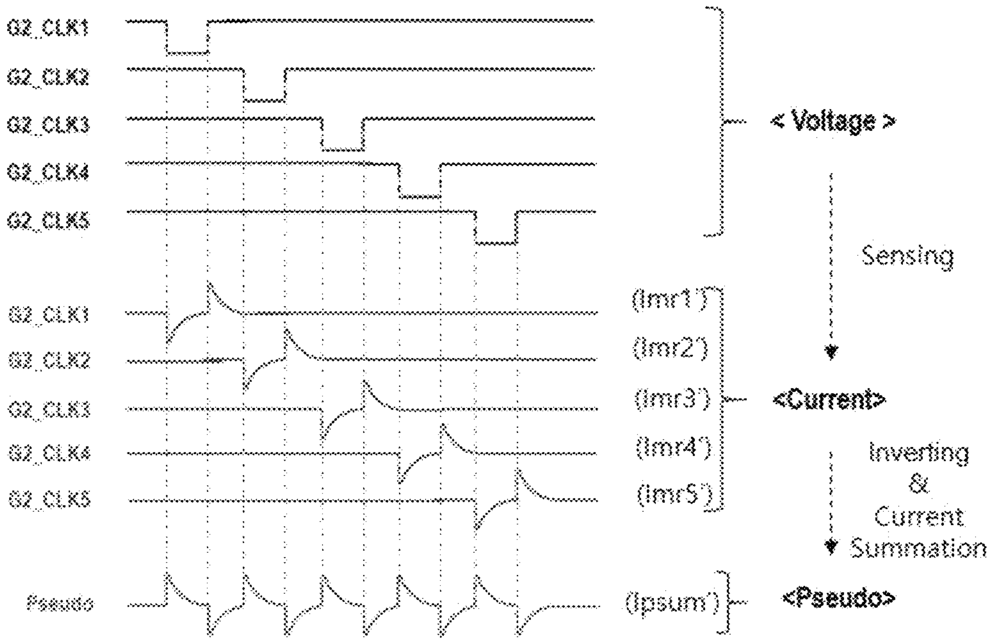

As illustrated in FIGS. 9, 14, and 15, five-phase second clock signals G2 output from the timing controller 120 may be up-shifted in level by the level shifter 135 and may thus be converted into second clock signals G2_CLK1 to G2_CLK5, and then, the second clock signals G2_CLK1 to G2_CLK5 may be applied to the current sensing and phase inverting circuit 133*a* & 133*b*.

$1^{st'}$ reference currents Iref1' to Iref5', $1^{st'}$ mirror currents Imr1' to Imr5', and $1^{st'}$ inverted currents Ips1' to Ips5' may be generated from the second clock signals G2_CLK1 to G2_CLK5 by the current sensing and phase inverting circuit 133*a* & 133*b*. Also, the $1^{st'}$ inverted currents Ips1' to Ips5' may be applied to the first or second pseudo pattern part 134*a* or 134*b* and may then be summated (Ipsum'), and thus, one pseudo signal (Pseudo) may be generated.

Figure 16:
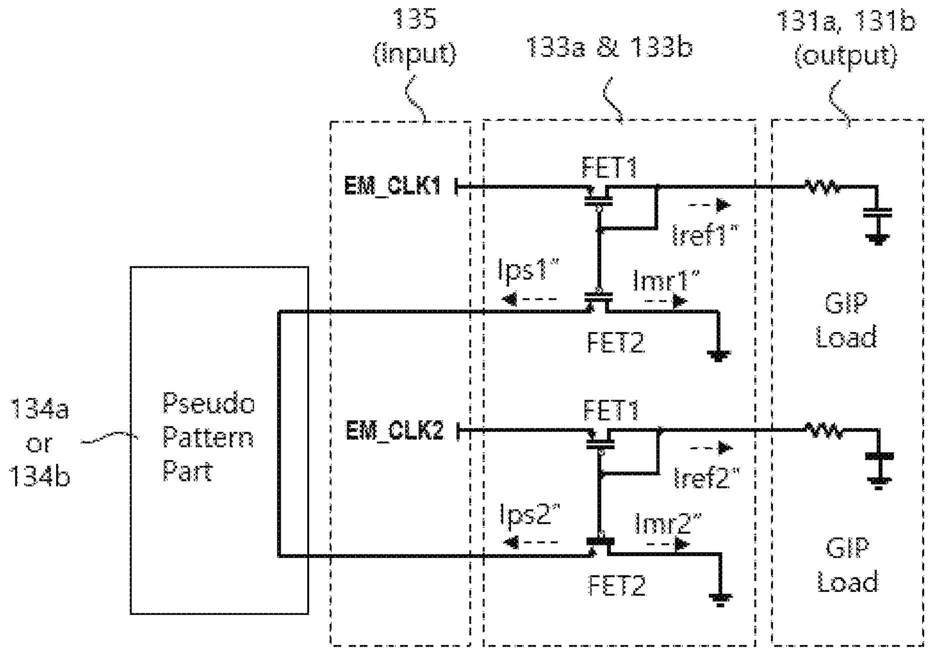
Figure 17:
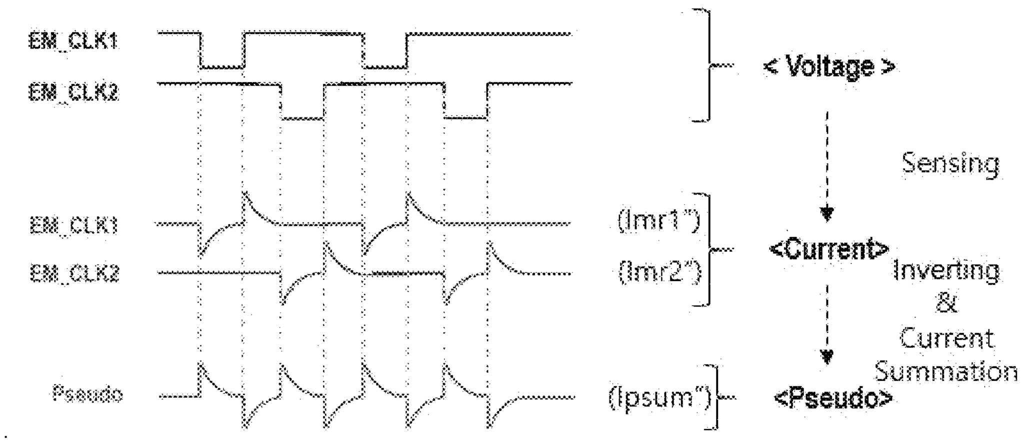

As illustrated in FIGS. 9, 16, and 17, two-phase third clock signals EM output from the timing controller 120 may be up-shifted in level by the level shifter 135 and may thus be converted into third clock signals EM_CLK1 and EM_CLK2, and then, the third clock signals EM_CLK1 and EM_CLK2 may be applied to the current sensing and phase inverting circuit 133*a* & 133*b*.

$1^{st''}$ reference currents Iref1" and Iref2", $1^{st''}$ mirror currents Imr1" and Imr2", and $1^{st''}$ inverted currents Ips1" and Ips2" may be generated from the third clock signals EM_CLK1 and EM_CLK2 by the current sensing and phase inverting circuit 133*a* & 133*b*. Also, the $1^{st''}$ inverted currents Ips1" and Ips2" may be applied to the first or second pseudo pattern part 134*a* or 134*b* and may then be summated (Ipsum'), and thus, one pseudo signal (Pseudo) may be generated.

In FIGS. 12, 14, and 16, an example is illustrated where the current summation circuit is included in the first or second pseudo pattern part 134*a* or 134*b* (an integration structure of the current summation circuit and the pseudo pattern part) and a corresponding current summation circuit is simply implemented as a rectilinear line. However, the current summation circuit and the pseudo pattern part may be implemented in various forms, based on a characteristic (radiation) of a signal, a material of an electrode or a line, a manufacturing process, and a peripheral circuit. Accordingly, in FIGS. 12, 14, and 16, the current summation circuit is illustrated as a rectilinear line along with the pseudo pattern part, so as to help understand current summation.

Furthermore, a pseudo signal may be used for offsetting and minimizing an electric field causing EMI of a pulse-type signal which is repeated with specific periodicity like the first clock signals G1_CLK1 to G1_CLK4, the second clock signals G2_CLK1 to G2_CLK5, and the third clock signals EM_CLK1 and EM_CLK2. A pseudo signal of a voltage type may be used, but a problem of radiation mismatching may occur due to various causes such as a line load, a driving environment, and a peripheral circuit.

For example, the first and second shift registers 131*a* and 131*b* may be large in load because of being connected to subpixels included in a display area, but the first and second pseudo pattern parts 134*a* and 134*b* may be small in load because of being connected to a pattern included in a non-display area (occupying a relatively small area). Therefore, in a case which generates a pseudo signal of a voltage type, a problem of radiation mismatching (caused by a reduction in electric field offset efficiency based on the use of a pseudo signal) may occur due to consumption current mismatching caused by a load difference between the first and second shift registers 131*a* and 131*b* and the first and second pseudo pattern parts 134*a* and 134*b*.

However, a pseudo signal of a current type may be robust to a cause which causes a variation of a signal, compared to the pseudo signal of a voltage type. Accordingly, when a pseudo signal of a current type is generated based on the pseudo generator 133 according to the first embodiment and is applied to the first and second pseudo pattern parts 134*a* and 134*b*, robustness to a load difference and noise may increase, and an electric field causing EMI may be offset and minimized.

Furthermore, when a pseudo signal corresponding to clock signals is generated as a current type and at least one of the pseudo signals are summated as one, an integration design of the pseudo pattern parts 134*a* and 134*b* may be performed, and an area occupied by the pseudo pattern parts 134*a* and 134*b* may be reduced, thereby reducing a bezel region of a display panel.

Figure 18:
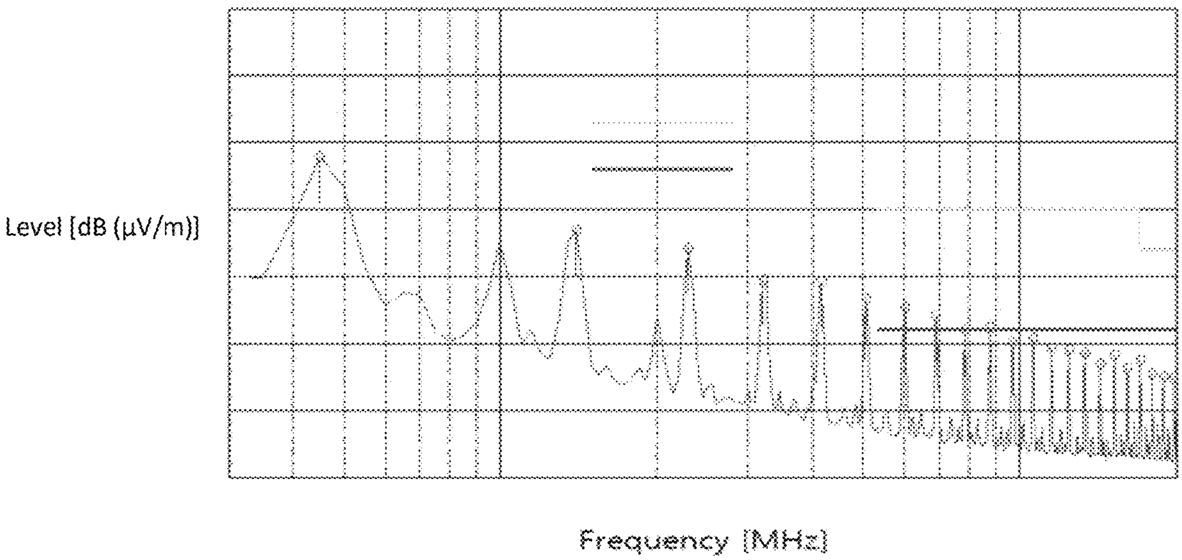
FIGS. 18 to 20 are diagrams for describing an electric field offset efficiency of the pseudo generator according to the second embodiment.
Figure 19:
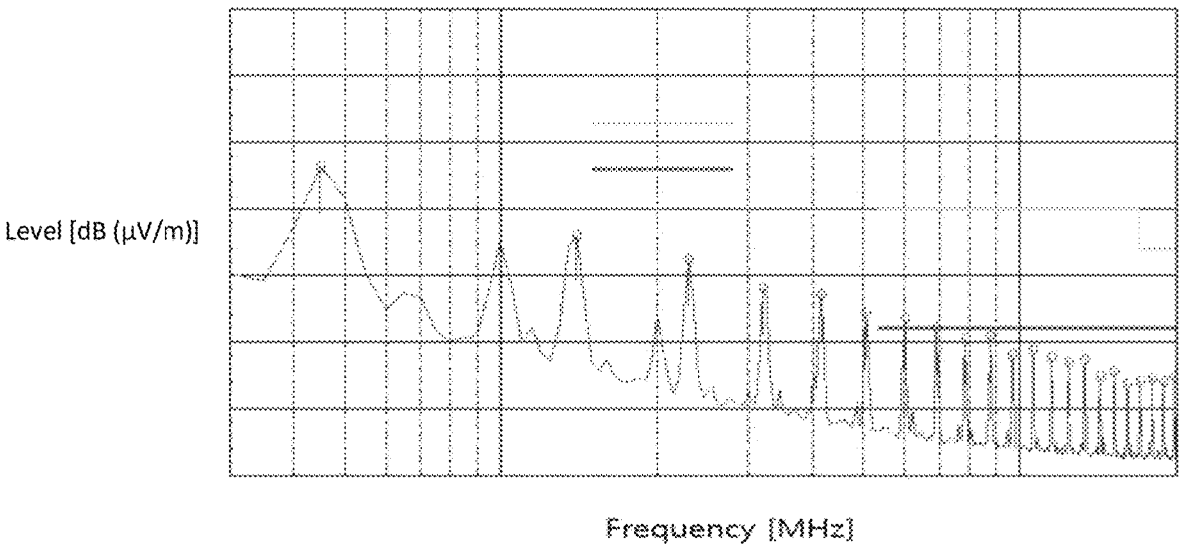
Figure 20:
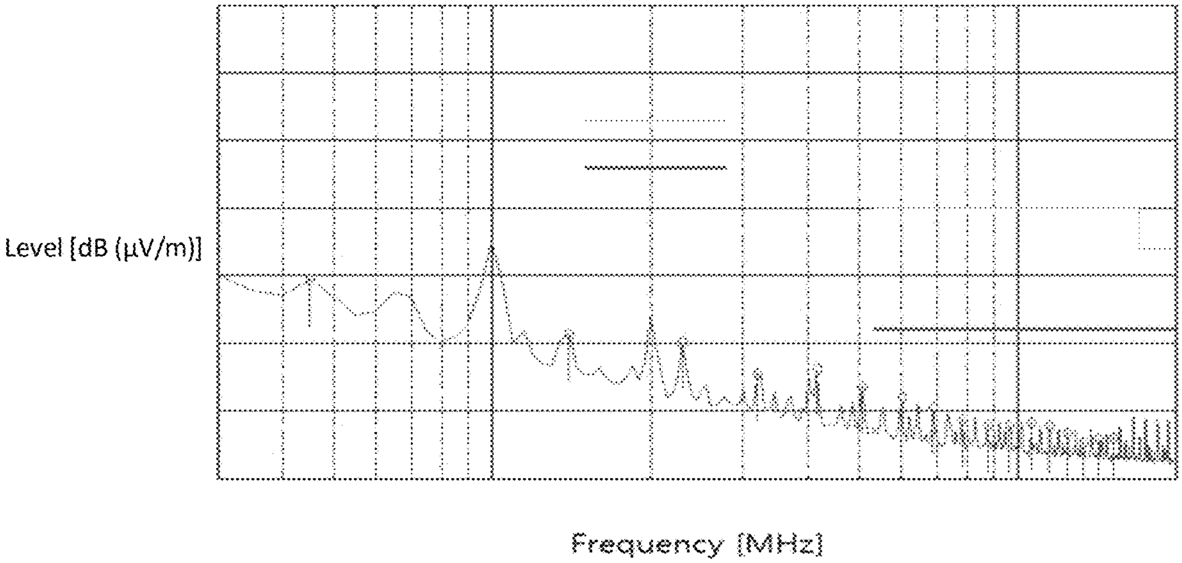

FIGS. 18 to 20 are diagrams for describing an electric field offset efficiency of the pseudo generator according to the second embodiment.

FIG. 18 is a graph showing a result obtained by measuring the amount of radiation of clock signals applied to a shift register, FIG. 19 is a graph showing a result obtained by measuring the amount of radiation of pseudo signals generated based on the pseudo generator according to the second embodiment, and FIG. 20 is a graph showing a result obtained by applying the pseudo signals of FIG. 19 to the clock signals of FIG. 18.

As seen through comparison between the graphs of FIGS. 18 and 19, when the pseudo generator according to the second embodiment is applied to a display apparatus, the amount of radiation of clock signals applied to the shift register and the amount of radiation of pseudo signals generated from the pseudo generator may be adjusted to be almost similar to each other.

This may be because, as seen in FIG. 20, as a result of application of the pseudo signals of FIG. 19 to the clock signals of FIG. 18, the degree of matching between two signals and electric field offset efficiency are enhanced, and thus, a radiation difference is reduced.

Moreover, in the present disclosure, an example which generates pseudo signals on only clock signals is illustrated and has been described. However, the pseudo generator may be applied to a pulse-type signal which is repeated with specific periodicity, like a multiplexer signal needed for driving of a display panel as well as the clock signals.

Hereinabove, may solve a problem of radiation mismatching caused by a load difference between a shift register and a pseudo pattern part, may increase robustness to noise, and may offset and minimize an electric field causing EMI. Also, the present disclosure may generate a pseudo signal of a current type corresponding to clock signals and may summate at least one of the pseudo signals to not only achieve an integration design of the pseudo pattern part, but also decrease an area occupied by a pseudo pattern part, thereby reducing a bezel region of a display panel.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A display apparatus comprising:

a display panel configured to display an image;

a shift register configured to output a gate signal that is applied to the display panel based on a periodicity signal that is output from a level shifter;

a pseudo generator configured to sense the periodicity signal to convert the periodicity signal into a current and invert a phase to output as a pseudo signal of an inverted current type; and a pseudo pattern part on the display panel, the pseudo pattern part including a pattern where the pseudo signal is applied, wherein the pseudo generator comprises a current sensing and phase inverting circuit including a first transistor configured to sense the periodicity signal to convert the periodicity signal into a current and a second transistor configured to operate identical to the first transistor and invert a phase of a sensed current to output as the pseudo signal of the inverted current type.

2. The display apparatus of claim 1, wherein the pseudo pattern part comprises a pattern that offsets an electric field generated from the periodicity signal based on the pseudo signal.

3. The display apparatus of claim 1, wherein the pseudo generator comprises:

a current sensing circuit configured to sense the periodicity signal; and a phase inverting circuit configured to invert a phase of a sensed current to output as the pseudo signal of the inverted current type.

4. The display apparatus of claim 3, wherein the pseudo generator further comprises a current summation circuit configured to summate one or more inverted currents to generate a pseudo signal of a summation current type.

5. The display apparatus of claim 1, wherein the first transistor and the second transistor are arranged as a current mirror type.

6. The display apparatus of claim 1, wherein the first transistor comprises a first electrode connected to an input terminal, a second electrode connected to an output terminal, and a gate electrode connected to the output terminal and a gate electrode of the second transistor, and wherein the second transistor comprises a first electrode connected to the pseudo pattern part, a second electrode connected to a ground terminal, and the gate electrode connected to the output terminal and the gate electrode of the first transistor.

7. The display apparatus of claim 1, wherein the pseudo generator and the pseudo pattern part are in a non-display area of the display panel.

8. The display apparatus of claim 1, wherein the periodicity signal comprises clock signals.

9. A pseudo signal generator circuit comprising:

a pseudo generator configured to sense a periodicity signal to convert the periodicity signal into a current and invert a phase to output as a pseudo signal of an inverted current type; and a pseudo pattern part including a pattern for offsetting an electric field generated from the periodicity signal, based on the pseudo signal, wherein the pseudo generator comprises a first transistor configured to sense the periodicity signal to convert the periodicity signal into a current and a second transistor configured to operate identical to the first transistor and invert a phase of a sensed current to output as the pseudo signal of the inverted current type.

10. The pseudo signal generator circuit of claim 9, wherein the first transistor comprises a first electrode connected to an input terminal, a second electrode connected to an output terminal, and a gate electrode connected to the output terminal and a gate electrode of the second transistor, and wherein the second transistor comprises a first electrode connected to the pseudo pattern part, a second electrode connected to a ground terminal, and the gate electrode connected to the output terminal and the gate electrode of the first transistor.

11. The pseudo signal generator circuit of claim 9, wherein at least one of the pseudo generator and the pseudo pattern part further comprises a current summation circuit configured to summate one or more inverted currents to generate a pseudo signal of a summation current type.

* * * * *